(12) United States Patent
Grabner

(10) Patent No.: US 6,911,876 B2
(45) Date of Patent: Jun. 28, 2005

(54) COMMUNICATION TERMINAL FOR TRANSCEIVING TWO FREQUENCIES USING A COMMON ONE TURN ANTENNA

(75) Inventor: Wolfgang Grabner, Freilassing (DE)

(73) Assignee: Skidata AG, Gartenau (AT)

( * ) Notice: Subject to any disclaimer, the term of this patent is extended or adjusted under 35 U.S.C. 154(b) by 40 days.

(21) Appl. No.: 10/363,289

(22) PCT Filed: Jul. 3, 2001

(86) PCT No.: PCT/EP01/07579

§ 371 (c)(1),
(2), (4) Date: Feb. 27, 2003

(87) PCT Pub. No.: WO02/19250

PCT Pub. Date: Mar. 7, 2002

(65) Prior Publication Data

US 2003/0179108 A1 Sep. 25, 2003

(30) Foreign Application Priority Data

Aug. 31, 2000 (DE) .......................... 100 42 875

(51) Int. Cl.[7] .............................. H04B 5/02; H03H 5/00
(52) U.S. Cl. .................. 333/24 R; 333/101; 333/129; 333/132; 343/842; 340/825.72; 340/825.73; 455/41; 455/500
(58) Field of Search ................ 333/24 R, 100, 333/101, 129, 132; 455/41, 59, 88, 103, 500; 342/44, 51; 340/825.72, 825.73; 343/718, 841, 842

(56) References Cited

U.S. PATENT DOCUMENTS

| | | | | |
|---|---|---|---|---|
| 3,771,158 A | * | 11/1973 | Hatcher | 343/728 |
| 5,317,330 A | * | 5/1994 | Everett et al. | 343/867 |
| 5,355,521 A | | 10/1994 | Henoch et al. | 455/59 |
| 5,726,630 A | | 3/1998 | Marsh et al. | 340/572 |
| 5,734,332 A | | 3/1998 | Kirknes | 340/825.54 |
| 6,232,870 B1 | * | 5/2001 | Garber et al. | 340/10.1 |
| 6,310,581 B1 | | 10/2001 | Stockhammer | 343/718 |
| 6,335,906 B1 | * | 1/2002 | Engelmann | 368/10 |
| 6,342,844 B1 | * | 1/2002 | Rozin | 340/933 |
| 6,427,065 B1 | * | 7/2002 | Suga et al. | 455/41.1 |
| 6,674,365 B2 | * | 1/2004 | Grabner | 340/572.5 |
| 2003/0071732 A1 | | 4/2003 | Grabner | 340/572.5 |

FOREIGN PATENT DOCUMENTS

| | | |
|---|---|---|
| DE | 4213065 A1 | 10/1993 |
| DE | 10002311 C1 | 6/2001 |
| DE | 19831767 C2 | 3/2002 |
| EP | 0 642 096 A2 * | 3/1995 |
| JP | 61-265905 | 11/1986 |
| WO | WO99/63496 | 12/1999 |

* cited by examiner

Primary Examiner—Barbara Summons
(74) Attorney, Agent, or Firm—Flynn, Thiel, Boutell & Tanis, PC

(57) ABSTRACT

The invention relates to a terminal for communication with data supports which function in a non-contact manner, comprising a transreceiver circuit with two resonant circuits with antenna and condenser for the emitting of two radio frequency fields of different carrier frequencies, whereby the common antenna (A) for both resonant circuits comprises a winding.

6 Claims, 2 Drawing Sheets

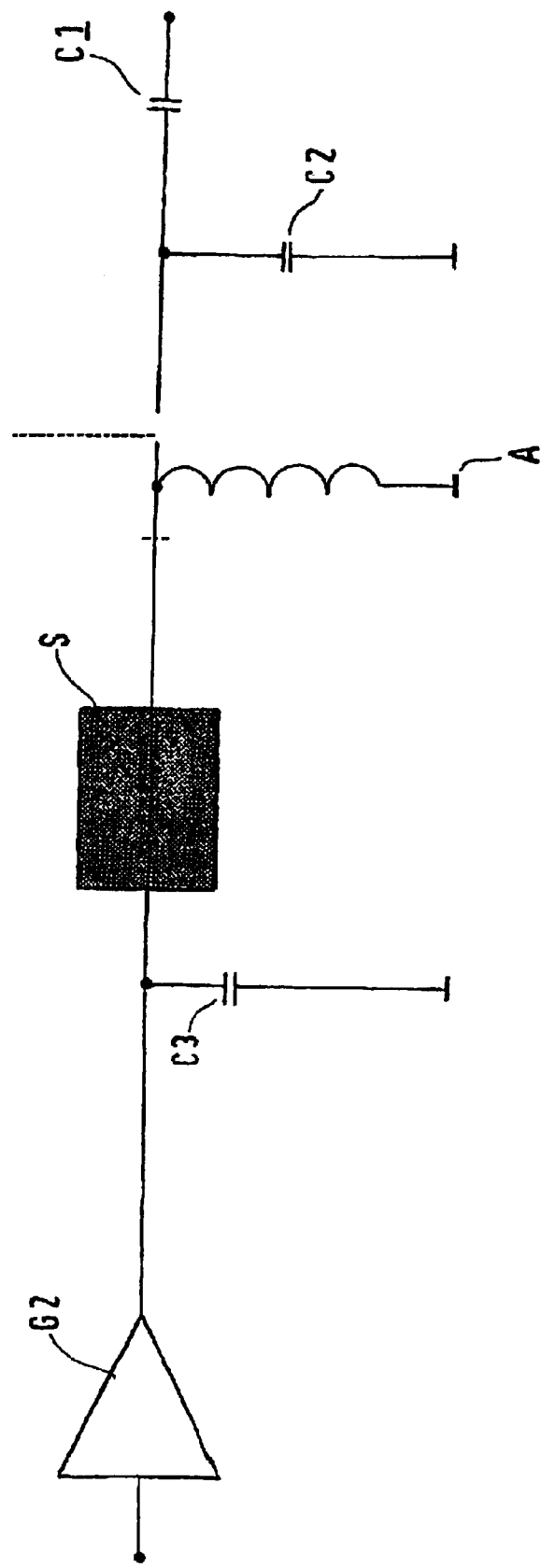

COMMUNICATION TERMINAL FOR TRANSCEIVING TWO FREQUENCIES USING A COMMON ONE TURN ANTENNA

FIELD OF THE INVENTION

This invention relates to a terminal for data communication with contactless-type data carriers having transceiving electronics for radiating two radio frequency fields with different carrier frequency.

BACKGROUND OF THE INVENTION

The data carriers are formed according to the transponder principle in such a way that the data stored in the data carrier can be read and, if required, changed after activation by the electromagnetic field of the terminal.

Such contactless-type data carriers are used in different areas. Examples to be mentioned are public transport systems, electronic purses and access entitlement ID cards. Nowadays there are two groups of transponders, low-frequency and high-frequency, which are used depending on the application.

According to recent regulations defining the permissible frequency bandwidth and transmitting energy radiated by the terminal, a carrier frequency of 13.56 megahertz is now stipulated. However, there are numerous systems that work at a different lower carrier frequency. This is in particular the case with access entitlement systems for ski lifts, which are integrated into wristwatches for example and use a carrier frequency of e.g. 122.8 kilohertz. These devices communicate with the access terminal via this carrier frequency to cause release of a blocking apparatus.

It is therefore necessary to form the terminals so that they can communicate with data carriers that work both at a high carrier frequency, such as 13.56 megahertz, and at a low carrier frequency, such as 122.8 kilohertz.

In this context it has been proposed to provide each terminal with two resonant circuits, one resonant circuit with a small antenna for the low carrier frequency and one resonant circuit with a large antenna for the high carrier frequency (DE 198 317 67). However, this construction has the disadvantage of significantly increasing production costs. In addition, the terminal requires much more space, which is frequently undesirable. Moreover, it has been ascertained that the two antennas can influence each other.

The patent application DE 100 02 311 C1 from the applicant has proposed to solve this problem by using a single, common antenna for both required resonant circuits, i.e. both the high-frequency and the low-frequency resonant circuit, of the terminal. This antenna is a multi-turn antenna, but it is not yet fully satisfactory for the high frequency of 13.56 megahertz due to the excessive inductance.

BRIEF SUMMARY OF THE INVENTION

The present invention is directed to a communication terminal that can communicate at both the high and the low carrier frequency while avoiding the abovementioned problems of the prior art.

It is accordingly proposed to use a single common antenna with one turn for both required resonant circuits in time-division multiplexing. The antenna is formed as a coaxial cable with an inner conductor cross section as great as possible, preferably between 0.5 and 10 millimeters, in particular 1 to 5 millimeters, especially preferably from about 2 to 3 millimeters. The great inner conductor cross section guarantees the Q necessary for attaining large ranges at the low frequency of for example 122.8 kilohertz. In addition, the antenna shield can be interrupted approximately in the middle area so as to prevent effects of asymmetrical parasitic currents flowing due to the asymmetry of the antenna. In a preferred embodiment, an auxiliary coil is provided that is intended to permit the two working frequencies to be combined. According to a further embodiment, the auxiliary coil is replaced with a switch.

The inventive terminal can thus communicate with two types of data carriers, namely ones working at a high carrier frequency, e.g. 13.56 megahertz, and ones working at a low carrier frequency, e.g. 122.8 kilohertz, the terminal preferably communicating only with one data carrier with one of said two carrier frequencies at a time.

BRIEF DESCRIPTION OF THE DRAWINGS

Hereinafter, the invention will be explained in more detail with reference to the drawings, in which:

FIG. 2 shows a complete circuit diagram of a further variant of the inventive communication terminal wherein the auxiliary inductance has been replaced with a switch.

DETAILED DESCRIPTION OF THE INVENTION

Figure 1:
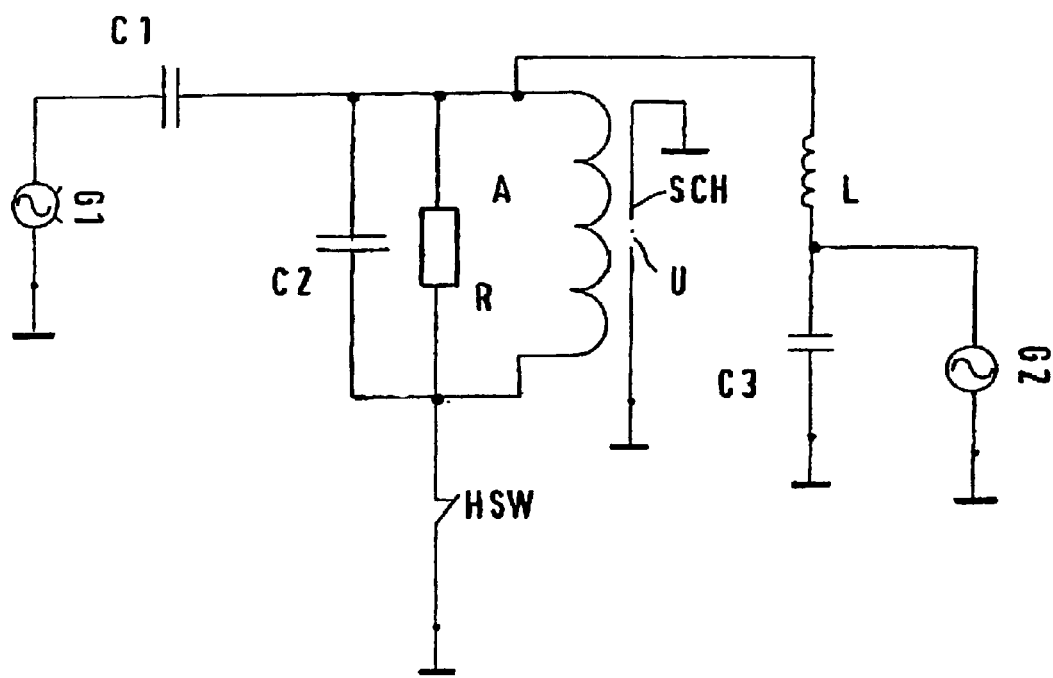
FIG. 1 shows a complete circuit diagram of the communication terminal according to a first variant of the invention for the frequencies of 13.56 megahertz and 122.8 kilohertz.

According to FIG. 1, the inventive circuit consists of high-frequency reader G1, low-frequency reader G2, coupling capacitor C1 for 13.56 megahertz, resonant capacitor C2 for the high frequency of e.g. 13.56 megahertz, resonant capacitor C3 for the low carrier frequency of for example 122.8 kilohertz, auxiliary inductance L, resistive attenuator R, auxiliary switch HSW, antenna shield SCH and coaxial antenna A. Antenna shield SCH is provided in the middle area with opening or interruption U.

Auxiliary coil L appears to be connected in series with the antenna for 122.8 kilohertz, in contrast to the frequency of 13.56 megahertz where auxiliary coil L and antenna inductance A are connected in parallel. The conductor cross section of the auxiliary coil is about 2 millimeters in order to guarantee a Q as high as possible for the 122.8 kilohertz resonant circuit. The functionality of the auxiliary coil at the 13.56 megahertz frequency is that it prevents the A.C. voltage short of resonant capacitor C3 from shorting the antenna. This means that the high frequency current occurring at 13.56 megahertz is divided evenly over the antenna inductance and auxiliary inductance L. This principle has the consequence of halving the energy of the magnetic field of the antenna that is necessary for communication, the remaining energy sufficing for proper working of the communication terminal. For the 122.8 kilohertz resonant circuit, the series connection of auxiliary inductance L and antenna A likewise halves the existing energy.

As apparent from FIG. 1, resistive attenuator R is connected in parallel with the antenna, a fact resulting from the required high Q for the 122 kilohertz resonant circuit. The resistive attenuator can be used to regulate and control the Q reduction of the antenna. The resistive attenuator can assume very great values because the reactance of the antenna is two orders of magnitude greater at the high frequency than the corresponding reactance at 122.8 kilohertz.

Resonant capacitor C2 serves to trim the 13.56 megahertz of the 13.56 megahertz antenna and constitutes an open circuit due to its very high reactance for the 122.8 kilohertz resonant circuit, so that its functionality is not influenced. Accordingly, coupling capacitor C1 serves to trim and adapt the antenna parallel resonance for the load of 50 Ω required by the reader. Like resonant capacitor C2, capacitor C1 constitutes an open circuit due to the high reactance for 122.8 kilohertz. According to the invention, resonant capacitor for 122.8 kilohertz C3 serves as a resonance trimming measure, its capacitance constituting a short for 13.56 megahertz.

Auxiliary switch HSW shown in FIG. 1 is constantly closed for resonant circuit operation at 13.56 megahertz according to the invention. This switch is formed to have extremely low impedance so as to influence as little as possible the Q required for the desired range at 122.8 kilohertz. During an uplink the auxiliary switch is switched off at the times of incipient carrier gaps for the duration of said gaps, these time instants occurring in synchronism with a maximum carrier sinusoidal voltage at the feed-in point of the 122 kilohertz reader. For the duration of this gap the amplitude of the carrier does not change.

According to the invention, the currently existing energy of the resonant circuit is stored in the resonant capacitor.

In contrast to the prior art, the power amplifier for producing the carrier amplitude for the 122 kilohertz resonant circuit is formed to have high impedance.

According to FIG. 2, auxiliary inductance L is replaced with switch S, in a second embodiment. This has the advantage of avoiding an energy loss in the resonant circuit of 13.56 megahertz caused by the parallel connection with the auxiliary inductance.

According to the invention, switch S used may be an electromechanical relay, a pin diode, a field-effect transistor (FET), a wave trap, an inductance or a semiconductor relay.

What is claimed is:

1. A terminal for communication with contactless-type data carriers having transceiving electronics with two resonant circuits with common antenna (A) and capacitor for radiating two radio frequency fields with different carrier frequency, wherein the common antenna (A) for both the resonant circuits comprises a coaxial cable and an antenna shield interrupted in a middle area and has one turn.

2. A terminal according to claim 1, wherein the coaxial cable has an inner conductor cross section of 1 to 5 millimeters.

3. A terminal according to claim 1, wherein the coaxial cable has an inner conductor cross section between 0.5 and 10 millimeters.

4. A terminal for communication with contactless-type data carriers having transceiving electronics with two resonant circuits with common antenna (A) and capacitor for radiating two radio frequency fields with different carrier frequency, wherein the transceiving electronics has an auxiliary coil (L) disposed so as to be connected in series with the antenna (A) for a low-frequency resonant circuit while being connected in parallel for a high-frequency resonant circuit, and wherein the common antenna (A) for both the resonant circuits has one turn.

5. A terminal for communication with contactless-type data carriers having transceiving electronics with two resonant circuits with common antenna (A) and capacitor for radiating two radio frequency fields with different carrier frequency, wherein the transceiving electronics has a switch (S) disposed so as to be connected in series with the antenna (A) for a low-frequency resonant circuit while being connected in parallel for a high-frequency resonant circuit, and wherein the common antenna (A) for both the resonant circuits has one turn.

6. A terminal according to claim 5, wherein the switch (S) is selected from the group comprising an electromechanical relay, a pin diode, a field-effect transistor (FET), a wave trap, an inductance and a semiconductor relay.

* * * * *